United States Patent [19]
Zemke

[11] 4,091,958
[45] May 30, 1978

[54] FILLER CAP ASSEMBLY

[75] Inventor: Julius Zemke, Voorhees, N.J.

[73] Assignee: Technical Development Company, Glenolden, Pa.

[21] Appl. No.: 831,230

[22] Filed: Sep. 7, 1977

[51] Int. Cl.² .................................................. B65D 41/04
[52] U.S. Cl. .................................... 220/291; 220/315; 220/331
[58] Field of Search .............. 220/291, 292, 331, 335, 220/315

[56] References Cited
U.S. PATENT DOCUMENTS 2,067,658  1/1937  Chapin ................................ 220/291
2,965,260  12/1960  Padykula ........................ 220/331 X Primary Examiner—George T. Hall

[57] ABSTRACT

A filler cap assembly for containers of liquids, particularly of those which require periodic replenishing, checking or replacement, such as for rotating machines, internal combustion engines and motors. The filler cap is locked in a vibration-proof manner in its closed position by means of a mechanical spring and bosses arranged exteriorly with respect to the filler neck and is tiltable about bosses on the filler neck into the open position remaining captive with the filler neck. Additional elements can be mounted on top of the filler cap for specific operational purposes.

3 Claims, 6 Drawing Figures

FILLER CAP ASSEMBLY

BACKGROUND

Various patents of prior art teach filler caps utilizing mechanical springs for the generation of pressure to maintain the respective filler caps in the closed position, and in the closed and open position, selectively. These teachings include, but may not be limited to, the following examples and references:

| Harris | 1,277,918 | Sept. 3, 1918 | 220-35 |
| Kehoe | 1,410,102 | March 21, 1922 | 220-35 |
| Heusser | 1,720,789 | July 16, 1929 | 220-35 |
| Getz et al. | 2,751,109 | June 19, 1956 | 220-35 |
| Thompson | 2,769,566 | Nov. 6, 1956 | 220-44 |
| Kohler | 848,965 | Sept. 11, 1952 | 220-35 |
| (Germany, 1 sheet drawing, 3 pages spec.) | | | |

The mechanical springs, primarily of the helical expansion and compression types, selectively, employed in that prior art display several disadvantages. They require at least one stationary pivot configuration, which occupies considerable space exteriorly with respect to the filler neck, or a corresponding structural support inside the filler neck, thereby obstructing access to the filler neck and to the vessel on which the filler neck is mounted. The springs used in these teachings become fully compressed and exert the largest pressure when not required for maintaining the closed or the open filler cap position, but apply only a fraction of the available pressure when the filler cap is in the closed or in the open position. This results in the third objectionable factor, namely, the low resistance to shock, vibration and unscheduled filler cap openings or closings upon inadvertent contact with the open or closed filler cap.

SUMMARY OF INVENTION

This invention extends to a filler cap, mounted on the filler neck of a vessel containing hydraulic fluid, having the following major characteristics:

(a) A tight lock between the filler cap and the opening of the filler neck is provided in the closed filler cap postion.

(b) The filler cap remains captive to the filler neck when in the open position and clears the access to the filler neck at its fully exposed inlet area.

(c) The filler cap can be tilted away from the filler neck inlet at random in any one of two possible directions.

(d) The filler cap is tiltable about two bosses mounted fixedly on the outside of the filler neck, keeping it not only captive to the filler neck, but precluding the use of any connecting members which could become lost, or interfere with significant operations.

(e) A bayonet type closure of the filler cap to the filler neck provides a secure filler cap seating against the effects of shock, vibration and nuisance reactions to inadvertent contacts with the filler cap.

(f) The foregoing, (e), is accomplished in coaction with a, in this case, wavy washer type spring, lodged loosely and exteriorly with respect to the filler neck and operable in such a manner than its force, upon its compression, is near the intended maximum when required for the securing of the filler cap in the closed position.

(g) In addition to the aforementioned safeguards, a turning motion of the filler cap is required to clear it from the open end of the filler neck, thereby enhancing the resistance of the assembly against the effects of shock, vibration and unintentional actuation.

(h) The filler cap design in accordance with this invention lends itself readily for the installation of additional accessories capable of complementing its basic function, without interference with the already provided operational elements, yet, resulting in specific useful and diversified applications.

Further advantages of the subject improvement — per se — and over prior art will become more apparent from the following description and the accompanying drawing.

In the drawing, forming a part of this application:

Figure 3:
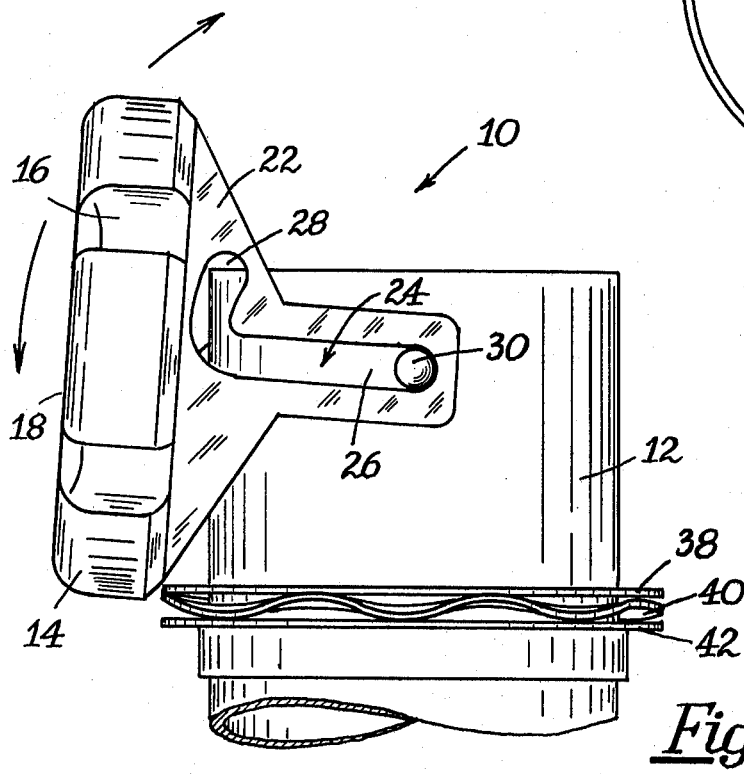
Figure 4:
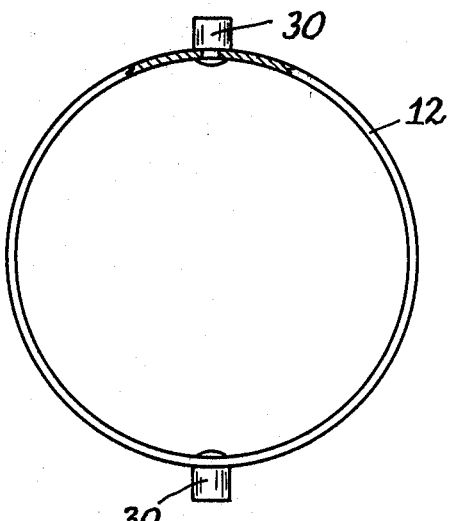
Figure 5:
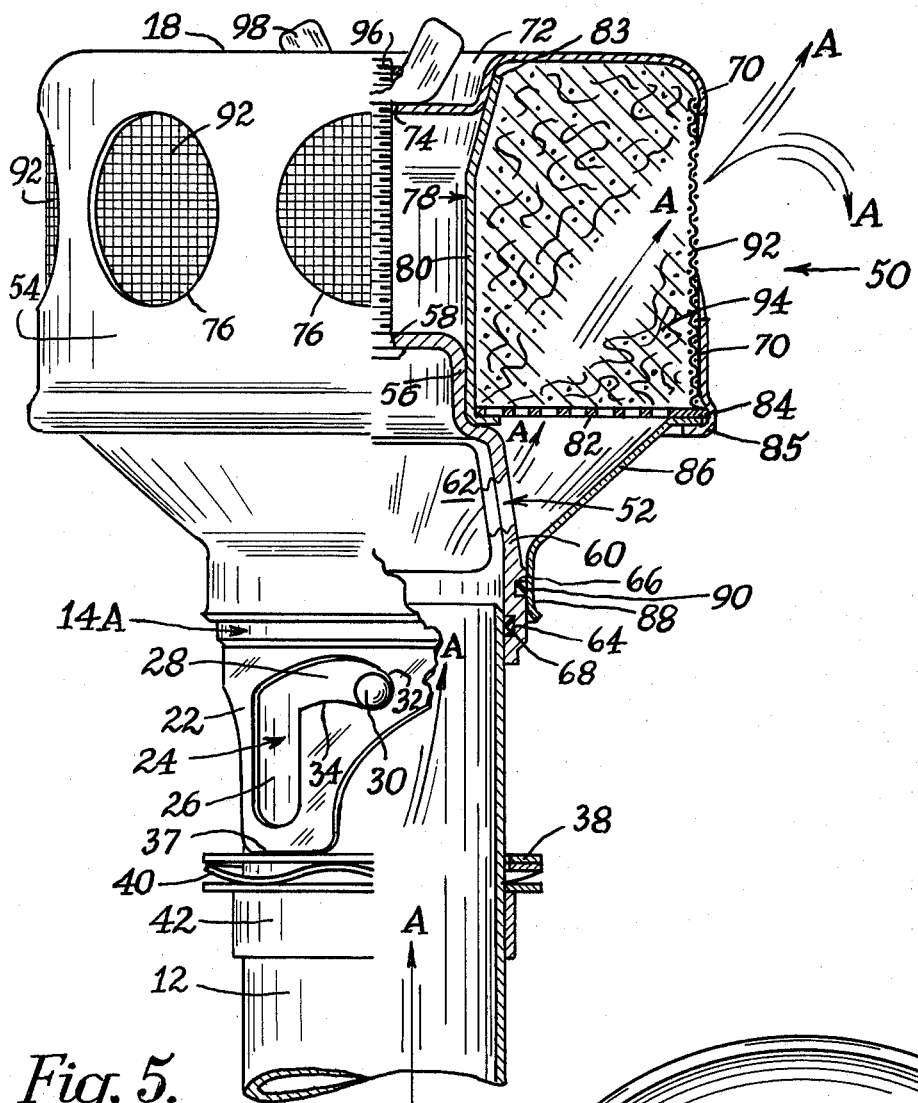
Figure 6:
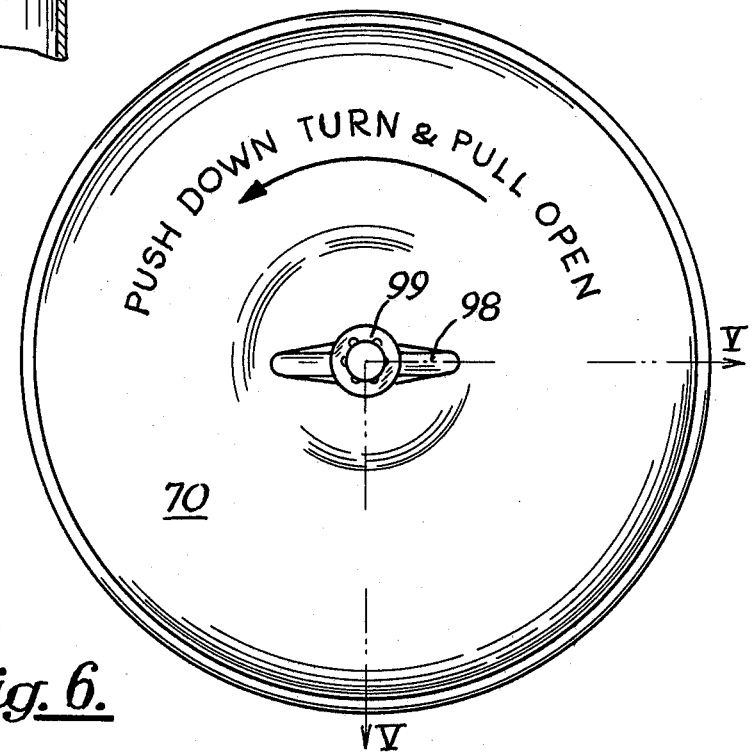

FIG. 3 portrays, in front elevation, the upper portion of a filler neck to which the filler cap is captively attached, in the open filler neck and tilted filler cap position;

FIG. 4 illustrates, in a top view and partly in cross-section in the plane IV—IV, the filler neck inlet and the bosses for the filler cap installation to the filler neck;

FIG. 5 shows, in front view and partly in cross-section in the plane V—V, a filler neck and filler cap assembly in the closed position, whereby the filler cap is equipped with a breather, and FIG. 6 is a top view of the assembly presented in FIG. 5.

DETAILED DESCRIPTION

Figure 1:
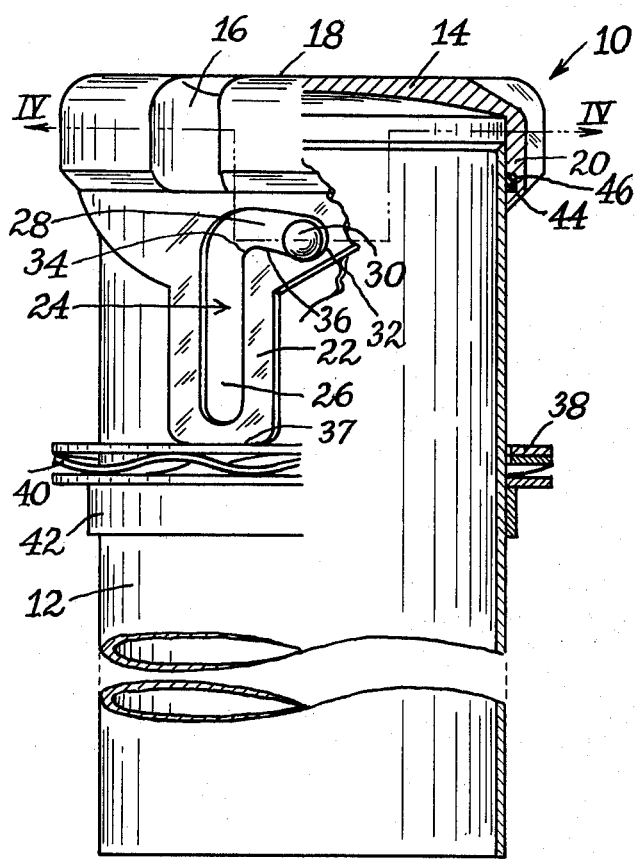
FIG. 1 shows in front view and partly in cross-section in the plane I—I, a filler cap and filler neck assembly in the closed position.
Figure 2:
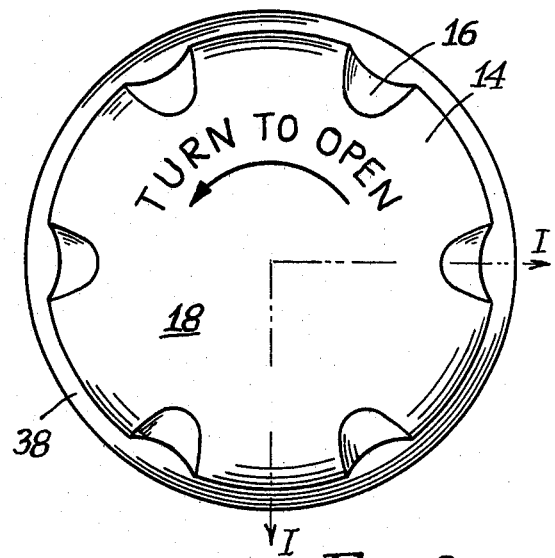
FIG. 2 is a top view of the assembly indicated in FIG. 1.

Referring now to the drawing, wherein like reference numerals designate like or corresponding parts and, more particularly, to FIGS. 1 and 2, portraying a typical filler cap 10 in assembly with a filler neck 12, said filler cap 10 consists of a downwardly open, cup-shaped lid 14 having a plurality of grip notches 16 formed on its exposed top 18 and a lateral, cylindrical wall 20, and two extension 22 formed downwardly and laterally from two opposite ends of a diameter of said cylindrical wall 20, noting that the second, far extension is hidden behind said filler neck 12 as viewed in FIG. 1. A slot 24 is formed in each of said extensions 22 having a straight and laterally extending portion 26 and an upwardly curved, helical portion 28, when viewed in FIG. 1. The width of each of said two slots 24 clears the diameter of each of the two bosses 30 which are mounted on and radially extending from the outside of the filler neck 12 at opposite ends of a filler neck diameter and at a first elevation below the top edge of the filler neck 12 and the bottom edge of the downwardly open, cup-shaped, filler cap lid 14. The upwardly curved, helical portion 28 of each said slot 24 is arranged so as to provide a low termination edge 32 and a crest position 34 for the lower edge 36 of each slot 24. The lower edge 37 of each extension 22 mates, in the closed filler cap position as shown in FIG. 1, with the upper annular surface of a flat washer 38, which is positioned around the outside of said filler neck 12. The inside diameter of said flat washer 38 clears the outside diameter of said filler neck 12. A wavy washer 40 is located underneath said flat washer 38. A ring member 42 having, for example, a cross-section of an inverted "L", is mounted fixedly of the lateral outside of said filler neck 12 at a second and larger distance below the top edge of said filler neck underneath said wavy washer 40 and at a distance from said flat washer 38 so as to cause a compression of said wavy washer 40 when the therein enumerated parts are in the position shown in FIG. 1. The so compressed wavy washer 40 applies pressure against the upper annular surface of said ring member 42 and, conversely, the same pressure against the lower annular surface of said flat washer 38 and, subsequently, against the lower edge 37 of said extensions 22, against said extensions 22 proper and, further, against said cylindrical bosses 30 with said terminating edges 32 of said slots 24, thereby establishing the locked and closed filler cap position as portrayed in FIG. 1. The interior of said cup-shaped lid 14 is equipped with an "O"-ring 44 which is lodged, in part, within an annular groove 46 which is formed in the lateral inside of said cylindrical wall 20. Said "O"-ring 44 serves as a seal between said lid 14 and said filler neck 12. The "O"-ring 44 is, if required, replaceable when the filler cap 10 is in the open position shown in FIG. 3.

The operation of the aforedescribed assembly from the in FIG. 1 shown closed position into the in FIG. 3 illustrated open position is as follows: The lid 14 is grasped with the fingers of one hand, whereby several fingers engage suitable grip notches 16. The lid 14 is then pressed down and turned, in this example, in a counter-clockwise direction when viewed from top and as indicated in FIG. 2, thereby causing a further downward motion in the direction of the axis common to both said lid 14 and said filler neck 12, due to the overriding of said bosses 30 over the races 36 against the biasing pressure of the now compressed wavy spring 40. As soon as this movement reaches the crests 34 of the races 36, the turning motion becomes terminated and the straight and axial portions 26 of the slots 24 are in engagement with said bosses 30, allowing for both the raising and the tilting of said cup-shaped lid 14, as shown in FIG. 3, and for the inspection, or the replenishment of the fluid, or for the replacement of said "O"-ring 44, as required.

The procedure for the return of said lid 14 and for the closing of the filler neck 12 is performed in exactly the reversed sequence with respect to that given above for the opening process.

It should be emphasized that the filler cap 10 may be tilted toward the left or toward the right side as viewed in FIG. 1, depending on the operator's dexterity or preference, the available space, or the service equipment accessibility. It may also be in order to reiterate that the filler cap 10 remains captive with the structure of said filler neck 12. Further, the observation of the open filler cap position in FIG. 3 demonstrates the complete clearing of and the unobstructed accessibility to said filler neck 12, per se, and in contrast to conditions existing at conventional filler cap configurations of prior art.

The filler cap and filler neck design in accordance with this invention lends itself readily and within the frame of these teachings to both the use and negotiation of accessories mounted on top of said filler cap 10, operating on their own merits and in combination with a said filler cap, selectively.

One of such possible variations, namely, that of a breather 50 application, is depicted in FIGS. 5 and 6.

This arrangement utilizes the formerly presented filler neck 12, a, however modified, lid 14A, an exposed top 18, a substantially cylindrical wall portion 20, extensions 22, slots 24, the straight slot portions 26, the helically curved slot portions 28, the cylindrical bosses 30, the terminating edges 32, the crest positions 34, the lower extension edges 37, the flat washer 38, the wavy washer 40 and the ring member 42.

The modified lid 14A is adapted to function as both the filler neck closure 52 and the support for, in this example, a breather vent container 54. The filler neck closure 52 consists of a substantially cylindrical, downwardly open cup portion 56 having a hole 58 formed in its top center, said cup portion 56 extending to an, also downwardly open, portion 60 of a truncated conical shape having a plurality of slots 62, an internally facing annular groove 64 and an externally facing annular groove 66 formed therein.

A first "O"-ring 68 is lodged, in part, within said internally facing annular groove 64, establishing a seal between said filler neck 12 and said cylindrical wall 20 of the filler neck closure 52 in the closed position.

The breather vent container 54 consists of a cylindrical, downwardly open cup 70 having a cylindrical recess 72 concentric with the former's axis and a hole 74 in its horizontal base, also concentric with said axis and a plurality of apertures 76 formed in its lateral wall. A cylindrical, cross-sectionally "L"-shaped member 78 having a solid vertical, on top outwardly flared wall portion 80 and a perforated horizontal annular wall portion 82 are lodged inside said cup 70 in such a manner that the upper edge 83 of the wall portion 80 adheres to the vertical wall of said recess 72, whereas the outer edge 84 of said perforated annular wall 82 is crimped along its periphery within the bottom flange 85 of the wall cup 70. The inside diameter of the cylindrical, vertical wall portion 80 is of such a dimension as to provide a force fit and a seal with the outside of the cylindrical wall portion of said cup 56. A shell 86 having the shape of an inverted truncated cone and a cylindrical extension 88 formed at its lower edge, is crimped along its top periphery, together with said outer edge 84 of said annular, perforated wall 82 into said bottom flange 85 of said cup 70. The inside diameter of said cylindrical extension 88 is of such a dimension as to provide a force fit and a seal with a second "0"-ring 90, which is lodged, in part, within said externally facing annular groove 66. A cylindrical screen 92 is placed inside of and contiguous with the cylindrical wall of the cup 70. The space between said screen 92, said annular "L"-shaped member 78 and the inside of the top of said cup 70 is occupied with curled wood filter media 94.

A threaded bolt 96 is inserted, head-down, through said hole 58 and through said hole 74, extending beyond the latter to allow for the application of a, in this case, wing nut 98, leaving excess length for the insertion of a lock washer 99. This arrangement permits the removal and replacement, selectively, of the breather vent 50 with respect to the lid 14A, as well as the servicing of the breather vent.

The performance of the breather, per se, and in coaction with the filler cap is indicated through the arrows "A", representing the flow of fumes, or gases, escaping from the filler neck 12, through the perforations within said annular wall 82, passing through said curled wool filter media 94, through the screen 92 and through said apertures 76 to the ambient atmosphere.

The negotiation of the breather vent equipped filler cap is identical with that presented herein for the filler cap according to FIGS. 1 and 2. The arrangement of the bosses 30 in FIG. 4, applies, likewise, to both filler cap assemblies.

With the exception of the "O"-rings, steel is the preferred material for the herein described parts.

It is understood that the herein shown and described embodiments of the subject invention are but illustrative and that variations, modifications and alterations are feasible within the spirit of these teachings.

What is claimed is:

1. A filler cap in combination with a filler neck comprising:

A filler neck being a hollow cylinder, having an annular face perpendicular to the axis of said hollow cylinder and a cylindrical boss mounted below and at a first distance from said annular face at each opposite end of one filler neck diameter, a ring member mounted exteriorly with respect to said filler neck at a second distance from and below said annular face, a washer-shaped wavy spring positioned exteriorly with respect to said filler neck and on top of said ring member, a flat washer positioned exteriorly with respect to said filler neck and on top of said washer-shaped wavy spring, a filler cap having the shape of a downwardly open, cylindircal cup, a plurality of grip notches formed on its outside, one flat extension formed axially and downwardly from the lateral wall of said filler cap at each opposite end of one filler cap diameter and an internally facing annular groove formed therein, an "O"-ring lodged, in part, within said annular groove, a slot formed in each of said flat extensions composed of a straight axial portion for hinging said filler cap rotatably to said cylindrical bosses on said filler neck and of a helically curved top portion causing the engagement between said cylindrical bosses, said extensions and said flat washer biased by said washer-shaped wavy spring for the secure and leakproof locking of said filler cap to said filler neck upon the turning of said filler cap.

2. A filler cap in combination with a filler neck as defined in claim 1, wherein a breather is mounted on the top of said filler cap coacting mechanically with said rotatable and lockable filler cap and communicating operationally and internally with said filler cap and said filler neck.

3. A filler neck closure in combination with a filler neck comprising:

A filler neck being a hollow cylinder having an annular face perpendicular to the axis of said hollow cylinder and a cylindrical boss mounted below and at a first distance from said annular face at each opposite end of a filler neck diameter, a ring member mounted exteriorly with respect to said filler neck at a second and larger distance below and from said annular face, a washer-shaped wavy spring positioned exteriorly with respect to said filler neck and on top of said ring member, a flat washer positioned exteriorly with respect to said filler neck and on top of said washer-shaped wavy spring, a filler neck closure having a downwardly open, cup-shaped top portion and a hole formed in its base, a radially and outwardly extending offset shoulder formed at the bottom of said downwardly open cup-shaped cylindrical top portion, a center portion having the shape of an inverted truncated cone, extending below said offset shoulder and terminating in a cylindrical bottom portion, said center portion having at least one slot formed in its lateral wall, said cylindrical bottom portion having an internally facing annular groove and an externally facing annular groove formed therein and one flat extension formed axially and downwardly from the lateral wall of said cylindrical bottom portion at each opposite end of a diameter of said cylindrical bottom portion, a first "O"-ring lodged, in part, in said internally facing annular groove establishing mating with and a seal between said filler neck and the cylindrical bottom portion of said filler neck closure, a second "O"-ring lodged, in part, in said externally facing annular groove, a slot formed in each of said flat extensions composed of a straight axial portion for hinging said filler neck closure rotatably to said cylindrical bosses on said filler neck and of a helically curved top portion establishing the engagement between said cylindrical bosses, said extensions and that falt washer biased by said washer-shaped wavy spring to secure and lock said filler neck closure upon the manual depressing and turning of said filler neck closure, a substantially cylindrical member having an "L"-shaped cross-section and an outwardly flared top portion mounted on said offset shoulder of said filler neck closure, an annular, perforated wall positioned horizontally about and at the bottom of said cross-sectionally "L"-shaped member, a shell having the shape of an upwardly open truncated cone, a horizontal flange formed at its upper end and a cylindrical extension formed at its bottom, positioned underneath said annular perforated wall and mating at its upper edge with the outer edge of said annular perforated wall, said cylindrical extension mating and establishing a seal with said second "O"-ring in said cylindrical bottom portion of said filler neck closure, a downwardly open, substantially cylindrical cup having a substantially cylindrical recess formed in its top and a hole formed in said recess concentric with the axis of said cup, at least one aperture formed in the lateral side of said cup and a flange formed at its bottom adapted to crimp said annular perforated wall and said horizontal flange of said shell together, a cylindrical screen extending axially from said annular perforated wall to near the top of the cylindrical wall of said downwardly open cup and positioned inside of and contiguous with said cylindrical wall of said downwardly open cup, curled wool filter media lodged in the space provided by said cylindrical, cross-sectionally "L"-shaped member, said annular perforated wall, said cylindrical screen and the top of said downwardly open cup, a threaded bolt having a head inserted through said hole in said filler neck closure and extending through and beyond said hole in said recess in said downwardly open cup, a wing nut and a lock washer mounted on said threaded bolt, on top of said recess, fastening said breather to said filler neck closure and allowing for its removal and replacement, selectively.

* * * * *